United States Patent
Borer et al.

[15] 3,670,628
[45] June 20, 1972

[54] KICKOUT VALVE AND CIRCUIT

[72] Inventors: Herbert W. Borer, Naperville; John R. Cryder; Edward A. Wirtz, both of Joliet, all of Ill.

[73] Assignee: Caterpillar Tractor Co., Peoria, Ill.

[22] Filed: Sept. 2, 1970

[21] Appl. No.: 69,009

[52] U.S. Cl. .............................. 91/358 A, 91/410, 251/251
[51] Int. Cl. ........................... F15b 13/01, F15b 13/16
[58] Field of Search ................... 91/358, 358 A, 388, 410; 214/762, 764; 137/624–627

[56] References Cited

UNITED STATES PATENTS

| | | | |
|---|---|---|---|
| 2,337,659 | 12/1943 | Hughey et al. | 251/251 X |
| 2,537,798 | 1/1951 | Smith | 251/260 |
| 3,128,677 | 4/1964 | Tennis | 137/624.27 X |
| 3,161,307 | 12/1964 | Schick et al. | 214/764 |
| 3,251,492 | 5/1966 | Kampert et al. | 214/762 X |
| 3,289,546 | 12/1966 | Erickson | 91/358 A |
| 3,420,393 | 1/1969 | Omon | 91/358 A |

Primary Examiner—Martin P. Schwadron
Assistant Examiner—Irwin C. Cohen
Attorney—Fryer, Tjensvold, Feix, Phillips & Lempio and Martin Majestic

[57] ABSTRACT

A kickout valve for use in a machine having a part moved by hydraulic pressure under control of a manual control valve which has a detent for holding it in an actuating position. The kickout valve is engaged when the movable part reaches a preestablished position. The valve is opened and admits fluid under pressure through a circuit leading to the control valve, where it causes release of the detent and allows the control valve to seek a closed or hold position and the moving part to come to rest.

5 Claims, 5 Drawing Figures

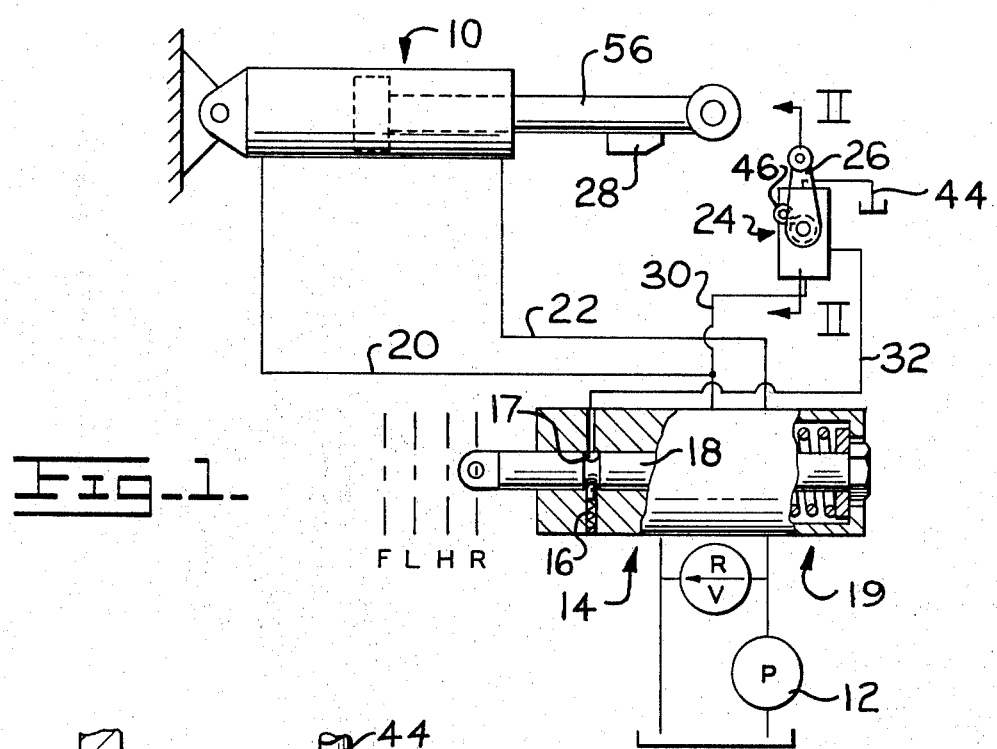
Fig. 1.
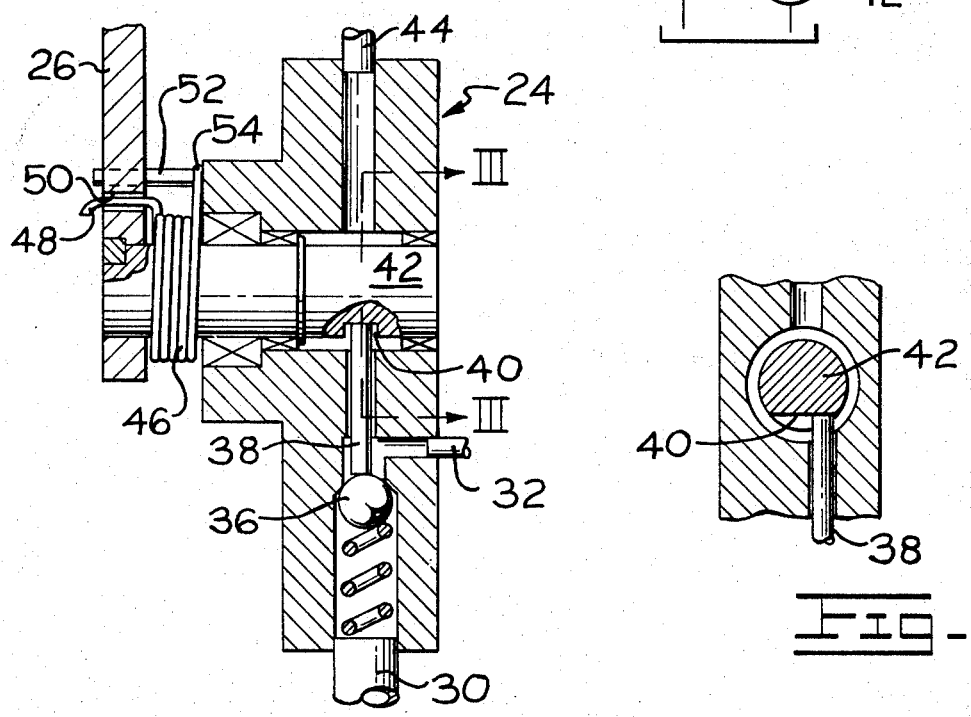
Fig. 2.
Fig. 3.
INVENTORS
HERBERT W. BORER
JOHN R. CRYDER
EDWARD A. WIRTZ
BY Fryer, Tjensvold, Feix, Phillips & Lempio
ATTORNEYS

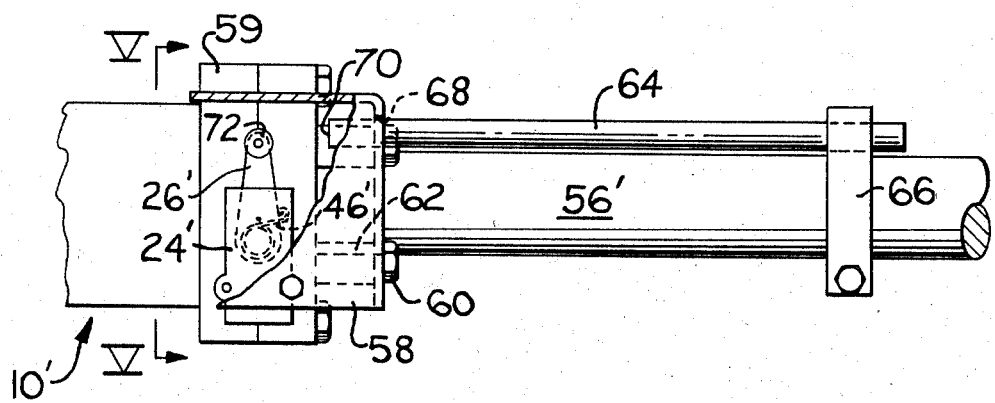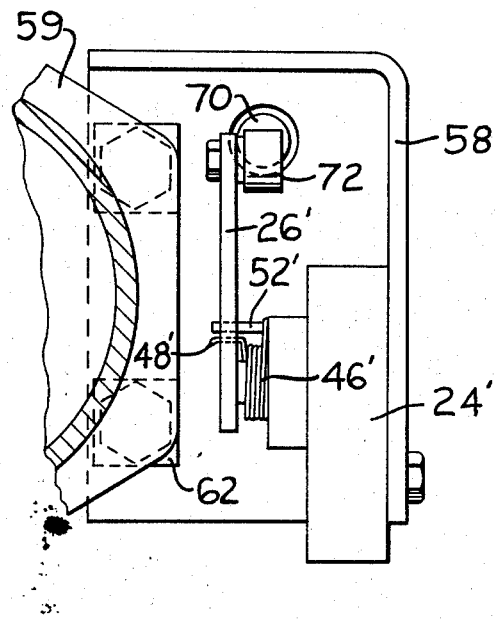

KICKOUT VALVE AND CIRCUIT

BACKGROUND OF THE INVENTION

It has become common practice in machines having components moved by hydraulic pressure to use control valves with detents to hold them in an activating position until the component reaches a desired point and then to cause automatic kickout or release of the detent and deactivation of the valve. This has the advantage of freeing an operator's hands for other duties and allowing him to devote his attention to other necessary operations. Examples of such kickout means are found in our assignee's patents to Beck, U.S. Pat. No. 3,122,247; to Muellner, et al., U.S. Pat. No. 3,155,252; to Freedy, et al., U.S. Pat. No. 3,234,855; and to Erickson, U.S. Pat. No. 3,289,546.

All of the patents referred to above relate to kickout or control mechanisms employed on tractor mounted bucket loaders, and the present invention will be described in this environment by way of one example of its intended use.

It is the object of the invention to improve upon kickout mechanisms and circuits by providing a very simple, durable and reliable valve mechanism and by providing a circuit for said valve mechanism which utilizes the pressure of fluid in the main actuating circuit for releasing the detent in a control valve. Other objects and advantages will become apparent upon an understanding of the following description wherein reference is made to the accompanying drawing.

BRIEF DESCRIPTION OF THE DRAWINGS

FIG. 1 is a schematic view of a hydraulic circuit for actuating a hydraulic motor and including the kickout valve and kickout circuit of the present invention;

FIG. 2 is a schematic central sectional view of the kickout valve taken on the line II—II of FIG. 1;

FIG. 3 is a fragmentary detail in section taken on the line III—III of FIG. 2;

FIG. 4 is a schematic view of an alternative embodiment of the invention showing a different mechanism for actuating the kickout valve; and FIG. 5 is a detail taken on the line V—V of FIG. 4.

DETAILED DESCRIPTION

Referring first to FIG. 1, a fluid motor is represented as a hydraulic jack generally indicated at 10 which may, for the purposes of the present description, be considered the lift jack which raises and lowers the lift arms of a bucket loader. A pump 12 directs fluid under pressure from a suitable reservoir through a control valve generally indicated at 14 to either end of the jack 10 while fluid from the opposite end is returned to the reservoir.

The control valve 14, which is conventional, has four positions generally referred to as float, lower, hold and raise, and it is shown in the raise position in which it is held by a detent urged by a spring 16 into a detent groove 17 within the spool 18 of the valve. A centering spring of conventional construction, generally illustrated at 19, tends to return the spool 18 to its hold position, closing all communication between the jack and the pump as well as between the jack and the reservoir.

In the raise position of the valve illustrated, the pump is directing fluid under pressure to a line 20 and to the head end of the jack 10 extending its rod and raising the loader lift arms (not shown). The fluid in the rod end of the jack is being exhausted through line 22 and control valve 14 to the reservoir.

The kickout valve of the present invention, generally indicated at 24, is normally closed but when its actuating lever shown at 26 is engaged by a cam 28 on the rod of the jack, it will be moved to an open position and fluid pressure from the pump and in the line 20 will be communicated through a branch line 30 and through the valve 24 to a line 32 which communicates with the detent groove control valve and causes retraction of the detent which permits the centering spring 19 to move the valve to its hold position.

The construction of the kickout valve 24 is shown in FIGS. 2 and 3 wherein a spring biased ball check 36 normally closes communication between the lines 30 and 32. A reciprocable plunger 38 which rests on the ball functions to open the valve against the bias of the spring. The opposite end of the plunger 38, as shown in FIGS. 2 and 3, normally engages the flattened portion 40 of a rotatable shaft 42 to which lever 26 is secured. Rotation of the lever, therefore, when it is engaged by the cam 28 on the rod of the jack brings the full diameter of the shaft 42 into contact with the plunger 38 and opens the valve to permit return of the control valve to its neutral or hold position as previously described.

During the moment when the check valve 36 is open, pressure from line 30 may escape into the chamber which contains the shaft 42 and any fluid escaping into this chamber is relieved back to the reservoir as through a vent line shown at 44 in FIGS. 1 and 2.

Kickout valve 24 includes a torsion spring 46 which is coiled around one end of shaft 42 and has one end 48 disposed in a hole 50 of lever 26 to urge the lever in a counter-clockwise direction (as seen in FIG. 1) against a positive stop 52. Stop 52 also serves to fix the other end 54 of the torsion spring. When lever 26 is against the stop, fluid flow through valve 24 is blocked, thereby interrupting flow to the detent mechanism. Retraction of cylinder rod 56 supporting cam 28 enables the torsion spring to return the lever to its normal position in which it abuts the stop.

Referring now to FIG. 4 there is shown an alternative embodiment of the invention wherein kickout valve 24' is secured to a bracket 58 which is mounted on the rod end 59 of cylinder 10' by means of bolts 60 and spacers 62. The hydraulic circuit utilized with this embodiment is not shown since it is identical to that shown in FIG. 1 for the first embodiment. Instead of utilizing a cam to actuate the valve as with the first embodiment, a striker rod 64 which is attached to rod 56' in parallel, spaced relation thereto by clamp means 66 and slidably extending through hole 68 in the bracket is used.

Upon retraction of rod 56' into cylinder 10', the free end 70 of striker rod 64 engages a roller 72 which is secured to lever 26' and forces the lever in a counter-clockwise direction (as seen in FIG. 4) against the bias of torsion spring 46'.

The structure and operation of valve 24' is identical with valve 24 of the first embodiment. It should be noted that, like parts of the second embodiment are identified by addition of a prime to their number designation in the first embodiment. As aforementioned with the first embodiment, rotation of lever 26' against the bias of torsion spring 46' causes the control valve to return to a hold position, thereby stopping the retraction of rod 56'.

In addition, the control valve can be manually manipulated to cause further retraction of rod 56' whereupon the underside of striker rod 64 holds lever 26' in the thus manually rotated position. Upon extension of rod 56' from cylinder 10', the striker rod end 70 moves away from roller 72, thereby allowing spring 46' to return lever 26' to its normal position abutting stop 52'.

It is to be understood that the foregoing description is merely illustrative of a preferred embodiment of the invention and that the scope of the invention is not to be limited thereto, but is to be determined by the scope of the appended claims.

What is claimed:

1. In a hydraulic system comprising a hydraulic motor, a source of fluid under pressure, a first, control valve having an open position for directing fluid from said source to said motor for operation thereof, a spring means normally closing said control valve, a detent means for holding said valve in the open position, a line communicating pressure from between said control valve and said motor for releasing said detent means, a second, kickout valve in said line, said kickout valve being spring biased by kickout spring means to a normally closed position, means movable by said motor for opening said kickout valve thereby releasing said detent means and allowing the spring means of said first, control valve to return said first valve to its normally closed position wherein operation of the hydraulic motor is stopped, said kickout valve including a lever which is spring biased by said kickout spring means against a stop in its normally closed position, said motor comprising a cylinder having a cylinder rod reciprocally extendable from one end thereof, said means on said motor for opening said kickout valve comprising means on said cylinder rod for engaging said spring biased lever and wherein said kickout valve and lever are so positioned with respect to said cylinder rod as to be in the path of said means on said cylinder rod for opening said kickout valve when said rod is actuated, and wherein said kickout valve comprises a body, a first passage within said body having a reciprocable plunger therein, one end of said first passage being in fluid communication with said line, a ball check biased by a ball spring means contained within said first passage and contacting one end of said plunger as well as closing said first passage by sealing against a portion of said first passage, a second passage in said body at right angles to and intersecting said first passage, a rotatable shaft contained within said second passage and having a flat portion thereon receiving the other end of said plunger, a third passage within said body communicating said detent means and said first passage between said ball check and said second passage, said plunger being of a length with relation to the spacing of said flat portion to said ball check such that said ball check sealingly closes said first passage when said flat portion of said rotatable shaft is in contact with said other end of said plunger and wherein when said rotatable shaft is rotated to bring said other end of said plunger into contact with the full diameter of the shaft, said plunger displaces said ball check from its sealing position against said portion of said passage against the bias of said ball spring means and thereby allows fluid under pressure to flow from said line, through said first passage and around said spring and said ball check and into said third passage and hence into the detent means.

2. The system of claim 1 wherein said rotatable shaft is an elongated member having one end within said body and the other end extending therefrom, and said lever is an elongated member having one end fixed to said other end of said shaft.

3. The system of claim 1 wherein said means on said cylinder rod for opening said kickout valve comprises a cam projection on said rod.

4. The system of claim 1 wherein said means on said cylinder rod for opening said kickout valve comprises a striker rod mounted in parallel, spaced relation to said cylinder rod.

5. The system of claim 4 wherein said kickout valve is mounted on the end of said cylinder by means of a bracket fastened thereto, said striker rod is an elongated member which is fixed at one end by clamp means to said cylinder rod, said bracket having a hole therethrough, the free end of said striker rod extending through said hole in said bracket, and said rod being so positioned such that the free end thereof engages said lever for actuation of said kickout valve when said cylinder rod is retracted.

* * * * *